United States Patent
Khlifi

(10) Patent No.: US 9,389,312 B2
(45) Date of Patent: Jul. 12, 2016

(54) RADAR SENSOR FOR A MOTOR VEHICLE, MOTOR VEHICLE AND COMMUNICATION METHOD

(71) Applicant: AUDI AG, Ingolstadt (DE)

(72) Inventor: Rachid Khlifi, Garching (DE)

(73) Assignee: AUDI AG, Ingolstadt (DE)

( * ) Notice: Subject to any disclaimer, the term of this patent is extended or adjusted under 35 U.S.C. 154(b) by 420 days.

(21) Appl. No.: 13/955,758

(22) Filed: Jul. 31, 2013

(65) Prior Publication Data

US 2014/0035774 A1 Feb. 6, 2014

(30) Foreign Application Priority Data

Aug. 1, 2012 (DE) .......................... 10 2012 015 250

(51) Int. Cl.
| | | |
|---|---|---|
| *G01S 13/02* | (2006.01) | |
| *G01S 13/93* | (2006.01) | |
| *G01S 7/00* | (2006.01) | |
| *G01S 13/42* | (2006.01) | |
| *G01S 13/58* | (2006.01) | |

(52) U.S. Cl.
CPC .............. *G01S 13/931* (2013.01); *G01S 7/006* (2013.01); *G01S 13/0209* (2013.01); *G01S 13/42* (2013.01); *G01S 13/58* (2013.01); *G01S 2013/936* (2013.01)

(58) Field of Classification Search
CPC ..... G01S 13/0209; G01S 13/42; G01S 13/58; G01S 13/931; G01S 2013/936; G01S 7/006
USPC .................................................... 342/21, 60
See application file for complete search history.

(56) References Cited

U.S. PATENT DOCUMENTS

| | | | |
|---|---|---|---|
| 2002/0003488 A1 | 1/2002 | Levin et al. | |
| 2002/0022927 A1 | 2/2002 | Lemelson et al. | |
| 2005/0021232 A1* | 1/2005 | Dickmann | G01S 13/931 701/301 |
| 2009/0237291 A1* | 9/2009 | Sakuma | G01S 5/0072 342/107 |
| 2010/0094508 A1* | 4/2010 | Kozyreff | B60R 21/0134 701/45 |
| 2010/0188265 A1 | 7/2010 | Hill et al. | |
| 2010/0194640 A1* | 8/2010 | Navarro | G01S 7/006 342/372 |
| 2010/0214085 A1* | 8/2010 | Avery | G08G 1/161 340/435 |
| 2011/0080312 A1 | 4/2011 | Oh et al. | |
| 2011/0221624 A1* | 9/2011 | Kavaler | G01S 7/003 342/22 |
| 2012/0032833 A1 | 2/2012 | Milligan et al. | |

FOREIGN PATENT DOCUMENTS

| | | |
|---|---|---|
| CN | 1894597 | 1/2007 |
| CN | 101243328 | 8/2008 |

(Continued)

OTHER PUBLICATIONS

Chinese Search Report with respect to counterpart Chinese patent application 201310326778.7.

(Continued)

*Primary Examiner* — Timothy A Brainard
(74) *Attorney, Agent, or Firm* — Henry M. Feiereisen, LLC

(57) ABSTRACT

A radar sensor for a motor vehicle has at least one antenna arrangement for transmitting and receiving radar signals and a controller for controlling the operation of the antenna arrangement. The controller evaluates the received radar signals. The controller also operates the antenna arrangement to transmit and/or receive messages in a car-to-car communication.

11 Claims, 2 Drawing Sheets

(56) References Cited

FOREIGN PATENT DOCUMENTS

| | | |
|---|---|---|
| CN | 101398479 | 4/2009 |
| CN | 101490578 | 7/2009 |
| DE | 102006054721 | 11/2007 |
| DE | 102009014105 | 9/2009 |
| DE | 102009026464 | 12/2010 |
| JP | 2005-56016 A | 3/2005 |
| WO | WO 2009/101169 | 8/2009 |
| WO | WO 2010/005649 | 1/2010 |
| WO | WO 2011/001206 | 1/2011 |
| WO | WO 2012/037680 | 3/2012 |

OTHER PUBLICATIONS

Translation of Chinese Search Report with respect to counterpart Chinese patent application 201310326778.7.

* cited by examiner

RADAR SENSOR FOR A MOTOR VEHICLE, MOTOR VEHICLE AND COMMUNICATION METHOD

CROSS-REFERENCES TO RELATED APPLICATIONS

This application claims the priority of German Patent Application, Serial No. 10 2012 015 250.7, filed Aug. 1, 2012, pursuant to 35 U.S.C. 119(a)-(d), the content of which is incorporated herein by reference in its entirety as if fully set forth herein.

BACKGROUND OF THE INVENTION

The present invention relates to a radar sensor for a motor vehicle, with at least one antenna arrangement for transmitting and receiving radar signals and a controller configured for controlling operation of the antenna arrangement and for evaluating the received radar signals. In addition, the invention relates to a motor vehicle and a communication method.

The following discussion of related art is provided to assist the reader in understanding the advantages of the invention, and is not to be construed as an admission that this related art is prior art to this invention.

Radar sensors, also for use in motor vehicles, are known in the art. In this case, radar signals are emitted, and reflected radar signals are received again by usually dedicated antennas of an antenna arrangement, so that the signals can be evaluated by evaluation logic, which may be provided in the radar sensor itself in form of a controller, for example, to detect other objects within the detection range of the radar sensor, as well as their speed by considering frequency differences and phase differences. Other evaluation methods are also possible, especially relating to an evaluation of a potentially dangerous situation, such as the risk of a collision, allowing safety systems of the vehicle to be controlled directly by the radar sensor.

Safety systems, in particular collision avoidance systems, have already been proposed in the prior art. The focus is hereby usually on the vehicle having the safety system, whereas other participating road users are also less involved in the driving process in critical traffic situations. However, the probability for a collision can be reduced dramatically, especially in extremely critical situations, when all involved road users are informed or warned about the risk. It has been proposed in this context to use car-to-car communication (car2car-communication or c2c-communication) to for example exchange information about a dangerous situation or other data.

Safety systems, in particular collision avoidance systems, frequently use radar sensors to monitor the surroundings and to derive therefrom, for example, probabilities for a collision and the like. For example, when a radar sensor of a first vehicle detects a second motor vehicle in a critical traffic situation, the second vehicle is initially tracked by the sensor for a certain time. When the second vehicle becomes critical, for example, when a collision probability threshold is exceeded, it is conceivable to inform the second vehicle via the car-to-car communication. An appropriate message is then provided by the radar sensor to a bus system of the first motor vehicle, which is configured to cause, on one hand, a warning and/or to trigger driving interventions in the first motor vehicle and, on the other hand, to reach a communication device for the car-to-car communication, where the information is converted into a message which is sent to the second motor vehicle. The second vehicle receives the danger-related information via its communication device, processes the information accordingly and transmits the information to its own bus system, which can accordingly initiate warnings and/or driving interventions.

Whereas the time window until a collision are usually very narrow in critical situations, it is evident that the described procedure may take quite some time before the actuator or the driver of the second vehicle can react, making it almost impossible to avoid an accident. Precious seconds can pass as a result of the detection, processing and transmission that would be critical for collision avoidance. Another disadvantage of the conventional solution is the complex and expensive hardware.

It would therefore be desirable and advantageous to obviate prior art shortcomings and to provide an improved method and system for supplying another vehicle more quickly with data, in particular information about dangerous situations, while at the same time reducing the hardware complexity and the cost.

SUMMARY OF THE INVENTION

According to one aspect of the present invention, a radar sensor for a motor vehicle includes at least one antenna arrangement with at least one transmit antenna and at least one receive antenna, wherein the at least one transmit antenna and the at least one receive antenna are configured to transmit and receive radar signals in a car-to-car communication, and a controller controlling operation of the antenna arrangement so as to transmit radar signals and messages in alternating cycles and to evaluate received radar signals.

According to the invention, it is proposed to combine the radar sensor and the car-to-car communication in a single device by using the same antenna arrangement, so that the radar sensor of the invention can also act as a communication device. In this way, latencies caused by the transmission in the bus system of the motor vehicle and processing in an external communication device can be significantly reduced, providing additional cost benefits or advantages due to reduced hardware complexity, because of the implementation of both functions in the same device. When the radar sensor itself already has a controller, only the controller must be expanded with a suitable functionality by adding signal processing devices for car-to-car communication.

This embodiment according to the invention provides the significant advantage that at-risk road users can be informed or warned virtually in real time about the identified critical traffic information. As a result, the collision probability, for example due to braking or an evasive maneuver, can be significantly reduced, in particular in relation to collision avoidance systems. It should already be pointed out here that the present invention provides already benefits when the radar sensor of the other motor vehicle receiving the message is not configured according to the invention, but the reception takes place instead via a dedicated car-to-car communication device of the other motor vehicle, because the transmission and processing path outside of the radar sensor in the first, transmitting vehicle is eliminated.

Advantageously, the controller may include a digital signal processor (DSP) capable of implementing, in addition to evaluation algorithms for processing the data obtained from the radar signals, also corresponding algorithms for generating messages to be transmitted.

According to an advantageous feature of the present invention, the controller may advantageously be designed to send evaluated data at least as part of a message. In other words, evaluated data obtained from the radar signals can transmitted directly, i.e. without involvement of other vehicle systems/controllers, also to another motor vehicle via the car-to-car communication. For example, a host motor vehicle, before the host vehicle systems have detected a dangerous situation, can be early on and specifically informed about a risk of a collision and the like by taking into account the evaluation data sent as part of the message. According to another advantageous feature of the present invention, the controller may be configured for, in particular, targeted transmission of evaluation data and/or additional data, in particular of data indicating at least the size of the host motor vehicle, in particular to another motor vehicle detected by the radar sensor and affected by the evaluation data.

According to another advantageous feature of the present invention, the antenna arrangement of the radar sensor may be designed for directional transmission, since other road users located in the detection area of the radar sensor may then be addressed via the car-to-car communication. In other words, messages of the car-to-car information may be sent or received directionally with the radar sensor according to the invention. It should be noted that through directed transmission of the message, even a motor vehicle that is not equipped with the radar sensors according to the invention is able to receive the message via a conventional car-to-car communication device, which may for example have a roof antenna.

According to another advantageous feature of the present invention, in particular when two vehicles are equipped with the radar sensor according to the invention and communicate with each other, other data may readily be sent in addition to the evaluation data, especially those data that improve the detection and data analysis in the receiving motor vehicle. For example, radar detection is disadvantageously unable to measure the spatial extent of objects. It is now possible with the car-to-car communication to receive external vehicle data, in particular the length, width, height and the like, directly at the radar sensor and to thus improve the reliability of the radar technology and to improve the analysis of the other object.

It should be understood that a car-to-car communication standard is used for sending messages, which ensures that messages can also be received by other vehicles.

As mentioned above, the same antenna arrangement is used in the radar sensor according to the invention, in which a car-to-car communication device is also integrated, for both functionalities, namely radar and communication. The present inventors have recognized that this is possible, if the frequency range that must be covered by the antennas of the antenna arrangement is not too wide. However, after radar technologies as well as car-to-car standard communication frequency bands in the range of about 6 GHz have become feasible, radar sensors and in particular WLAN-based car-to-car communication can be realized.

According to another advantageous feature of the present invention, the transmit and/or receive antenna arrangement may be designed for a frequency range that includes a radar frequency band and an adjacent and/or partially overlapping communication frequency band. Advantageously, the overlap should be kept small, wherein, for example, an overlap between the radar frequency band and the communication frequency band is less than 20% of the width of the radar frequency band and/or less than 40% of the width of the communication frequency band. The frequency range between 5700 MHz and 6000 MHz has proven to be a suitable frequency range because of the prior existence of a communication standard for car-to-car communication.

For example, in an actual embodiment, the radar frequency band used by the radar may extend from 5725 MHz to 5875 MHz. A frequency band used for car-to-car communication may extend between 5850 MHz and 5920 MHz With these adjacent frequency bands, the radar sensor of the invention can be readily implemented with exemplary antennas of the antenna arrangement having an adequate bandwidth of 195 MHz. The antenna arrangement is preferably designed as a patch antenna array, frequently referred to as "micro strip patch array antenna".

According to another advantageous feature of the present invention, the antenna arrangement may include at least one transmit antenna and at least one receive antenna, wherein the transmit antenna can, in particular, be controlled to alternately cycle between the transmission of radar signals for sending messages and/or wherein at least one filter unit for separating radar signals and messages is connected downstream of the receive antenna that is configured to receive radar signals and messages. As with conventional radar systems, the radar sensor according to the invention may also include a plurality of transmit antennas, and a plurality of receive antennas, for example two transmit antennas and four receive antennas. The transmit antenna transmits the radar signals, whereas the receive antenna receives the reflected radar signals (radar echo). As generally known, the distance, the angle, and the relative velocity to an object can be determined from the Doppler shift or phase shift by the controller, in particular a digital signal processor. Within the context of the present invention, the transmit antenna may advantageously transmit the radar signals and the message cyclically and consecutively. Because the cycle time of radar systems may be, for example, 50 ms and the car-to-car communication may be about 150 ms, the radar operation and the communication operation can be readily synchronized by the controller.

The at least one receive antenna is always active and constantly receives radar signals and/or messages, which can be separated with a corresponding filter unit, in particular when the communication frequency band and the radar frequency band have a small overlap or no overlap at all, so that the messages and the radar signals can be processed separately. A suitable filter unit may be implemented, for example, as a bandpass filter.

According to another advantageous feature of the present invention, the controller may be configured to take into consideration, when evaluating radar data, evaluation data and/or other data received by the radar sensor or by an external communication device within the context of a message. In other words, in particular messages received by the radar sensor itself may also contain data useful for the evaluation of radar signals which can then be properly taken into consideration. The dynamics of the radar sensors can thus be hugely increased, because, for example, tracking algorithms can be strongly accelerated by using the evaluation data and/or the additional data and/or the error detection rate can be greatly reduced by fusion, thereby greatly increasing the reliability of safety-related systems.

For example, in a specific application, the number of radar cycles necessary for a first detection may be reduced as a function of received evaluation data and/or the additional data. Radar systems usually require for the first detection multiple radar cycles until an object is considered detected. Such delayed detection may be unfavorable in critical traffic situations. However, when also taking into account data provided directly by another radar sensor of another motor vehicle within the context of car-to-car communication, a much earlier plausibility check of an object may be performed based on a first information commonly received via the motor vehicle car-to-car communication during the first radar measurement cycle, so that for example a warning can already be triggered during a first detection. The analysis carried out by the controller of radar signals can be further improved, as already described above, when external vehicle data such as length, width, height and the like of another motor vehicle are also sent as part of a message and considered as additional data.

According to another aspect of the invention, in addition to the radar sensor, the invention also relates to a motor vehicle, having at least one radar sensor according to the invention. All embodiments relating to the radar sensor can be applied analogously to the motor vehicle according to the invention, which therefore can provide the above-mentioned advantages. It should be noted that the motor vehicle may—in addition to the at least one radar sensor—include a dedicated car-to-car communication device.

According to another advantageous feature of the present invention, a plurality of radar sensors covering the entire surroundings of the vehicle may be provided. In other words, the motor vehicle may have a sufficient number of radar sensors for a uniform 360° radar view, so that in spite of the directional emission of the messages via the radar sensor and its antenna arrangement, respectively, a car-to-car communication can be realized in all directions. It should be emphasized again that it is advantageous when, even with a 360° range view, messages can also be sent and received directionally, so that, for example, when a collision should be avoided, the particular radar sensor, in whose receiving range the potential collision object or another affected road users is located, sends out a corresponding message.

A corresponding collision-avoidance functionality repeatedly mentioned above, which is implemented to a large extent by the controller of the at least one radar sensor, can be part of a collision avoidance system and/or another safety system of the motor vehicle.

Lastly, according to yet another aspect of the invention, a method for communicating between a motor vehicle and at least one additional road user includes transmitting or receiving, or both, at least one message via at least one antenna arrangement of a radar sensor of the motor vehicle, wherein the antenna arrangement includes at least one transmit antenna and at least one receive antenna, and cyclically controlling the transmit antenna to alternatingly transmit radar signals and to transmit messages. The radar sensor according to the invention can preferably be used, so that all statements made with reference to the radar sensor can also be applied to the inventive method. The antenna arrangement previously used for transmitting and receiving radar signals can also be used with the method of the invention to send and/or receive messages of the car-to-car communication, preferably both.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
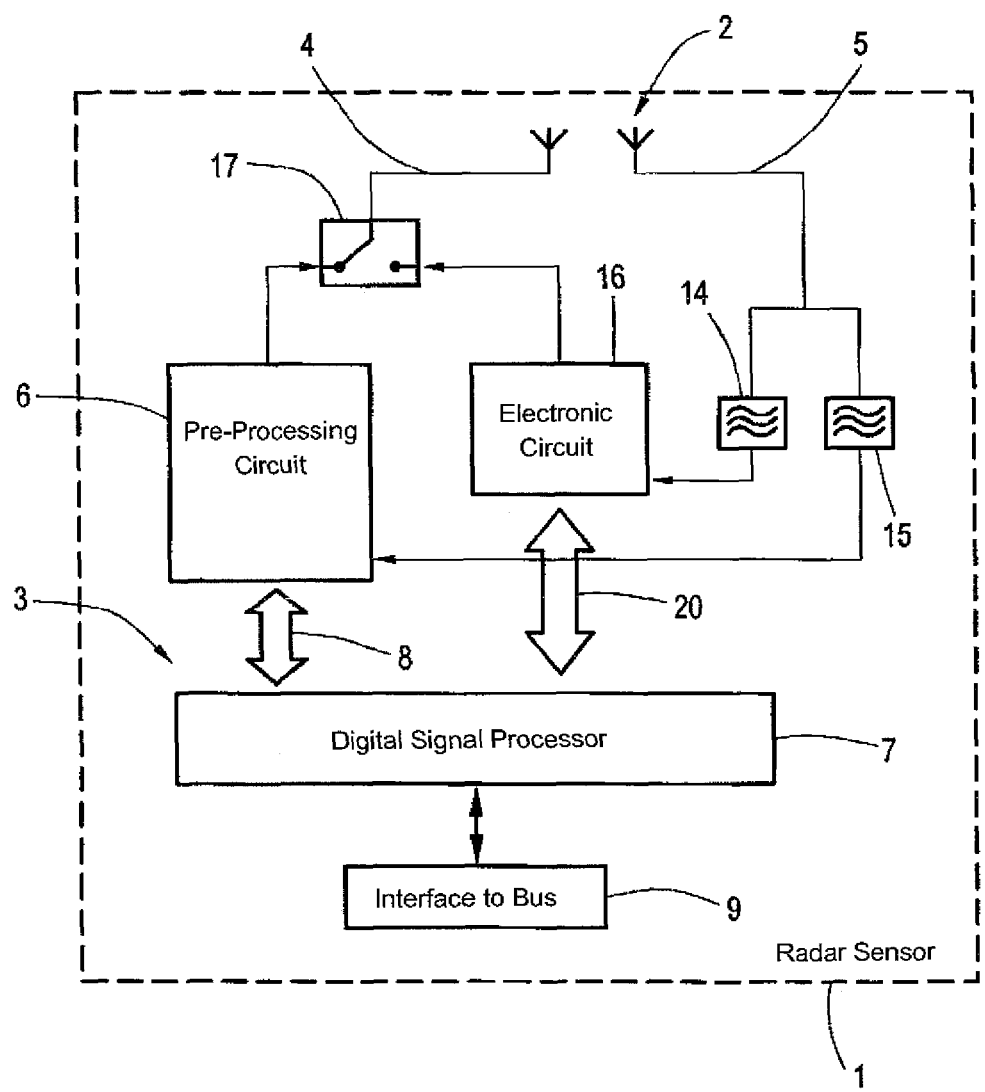
FIG. 1 is a schematic diagram of a radar sensor according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a radar sensor 1 according to the invention, which can also be used as a communication device for car-to-car communication, since the antenna arrangement 2 can be controlled by a controller 3 for both transmitting and receiving radar signals as well as for transmitting and receiving messages within the context of car-to-car communication.

It should be mentioned here again that components of the radar sensor 1 that are not essential for the invention are not shown for sake of clarity, such as the filter stages connected directly upstream of the antennas of the antenna arrangement 2 and an LAN on the receiving side.

The radar sensor includes as part of the antenna arrangement a plurality of antennas 4, 5, including at least one transmit antenna 4 and at least one receive antenna 5. Although only one respective antenna 4 and only one respective antenna 5 are shown in FIG. 1 for sake of clarity, it will be understood that a plurality of antennas 4, 5 of any type may be provided, for example, two transmit antennas 4 and four receive antennas 5. Radar signals, which can be received by the continuously receptive receive antennas 5, can be sent via the transmit antennas 4. An electronic circuit 6 is provided for suitable pre-processing of radar signals, wherein the electronic circuit 6 can be controlled and read by a digital signal processor 7 in the controller 3, arrow 8. The digital signal processor 7 is further configured to evaluate received radar signals or radar data, in this case more than just determining a speed, a distance and an angle of the object detected by the radar echo, thus rather operating like a collision avoidance system. A check is made, in this case already in the radar sensor 1, whether a critical traffic situation, in particular the danger of a collision, is present, for example by determining a probability for a collision.

Actuators of the motor vehicle in which the radar sensor 1 is installed can be controlled depending on specific criteria, for example collision probability thresholds, for which purpose the radar sensor 1 also includes an interface 9 to a bus system of the motor vehicle. Such functions of a radar sensor are already well known in the prior art. However, in the present case, the radar sensor 1 is configured so that messages of a car-to-car communication can also be transmitted and received via the antenna arrangement 2.

Figure 2:
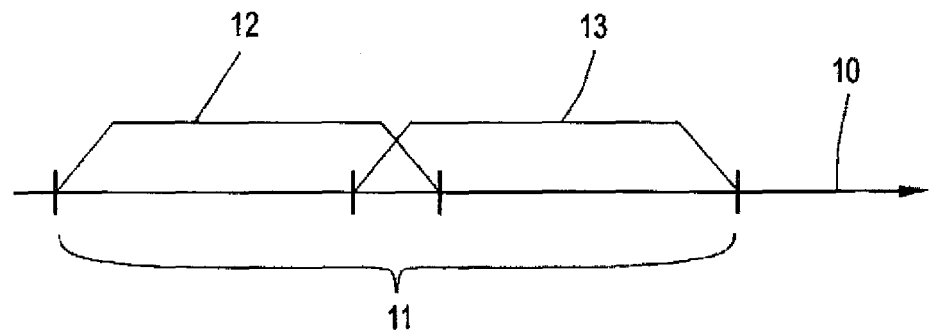
FIG. 2 shows a possible relative position of frequency bands.

For this purpose, the antenna arrangement 2 is constructed as a patch antenna array having antennas 4, 5 with a bandwidth of 195 MHz and able to send and receive in the range from 5725 MHz to 5920 MHz. In this frequency range, frequency bands for both the radar operation and the car-to-car communication are provided, which will be described with reference to the schematic diagram of FIG. 2. The frequency is here plotted on an axis 10, wherein the frequency range 11 corresponding to the bandwidth is highlighted. The radar frequency band 12 is here located within the frequency range 11, which may be located for example between 5725 MHz and 5875 MHz, and the communication frequency band 13, which may be located between 5850 MHz and 5920 MHz, which corresponds to a known standard for car-to-car communication. The frequency bands 12, 13 overlap only slightly, as illustrated.

In the case of reception with the receive antenna 5, filter units 14, 15 may be employed to separate messages of the car-to-car communication from the radar signals (radar echoes). Whereas radar signals are fed to the electronic circuit 6 for further processing, another electronic circuit 16 is also provided for the processing of the messages, with the separated messages from the filter unit 14 being supplied to the electronic circuit 16.

Figure 3:
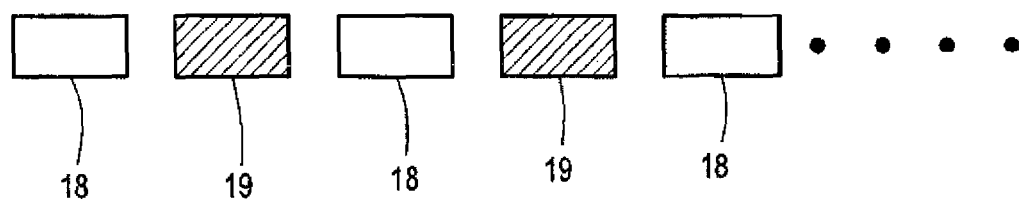
FIG. 3 is a diagram showing the operation of transmit antennas of the antenna arrangement.

A switching unit 17 is associated with the at least one transmit antenna 4, so that a cyclically alternating transmission of radar signals and messages can be realized, for example, each having a time window of 50 ms. This is schematically illustrated in FIG. 3 where it can be seen that time windows 18 for transmitting radar signals alternate with time windows 19 for sending messages of the car-to-car communication.

The digital signal processor 7 is also configured to control the transmit and receive operation of the messages of the car-to-car communication, as indicated by the arrow 20.

In the present exemplary embodiment, the dual functionality of the radar sensor 1 is advantageously used to send evaluation results of the radar signals, i.e. evaluation data, immediately, i.e. without further transport via the vehicle bus or further processing in other vehicle systems, as part of a message of the car-to-car communication. A receiving motor vehicle can therefore use the evaluation data selectively, which is particularly advantageous when the evaluation data are received directly from a radar sensor according to the invention. With respect to the transmit operation, the controller 3 is also configured to add additional data, in the present case in particular data relating to the size of the host vehicle, such as the height, width and length of the motor vehicle in which the radar sensor 1 is installed.

Conversely, the controller 3, in particular the digital signal processor 7, is also configured to take into account in the analysis of radar signals evaluation data received via messages and additional data. For example, received evaluation data suggesting the presence of an object may be used for a faster plausibility check of a detected object; and, for example, size information transmitted as additional data can be used to more accurately assess a current driving situation, because such information cannot be obtained by the radar functionality of the radar sensor 1.

Figure 4:
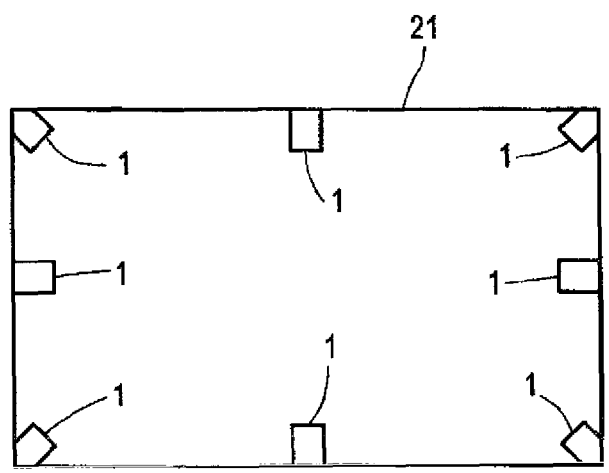
FIG. 4 shows a motor vehicle according to the invention.

Lastly, FIG. 4 shows a schematic diagram of a motor vehicle 21 according to the invention, which in the present example includes a plurality of radar sensors 1, which cover different areas of the surroundings of the motor vehicle so that the entire surroundings of the motor vehicle 21 is covered, i.e. a 360° radar view is provided. In such a configuration, a dedicated car-to-car communication device that is not integrated into a radar sensor 1 can be completely eliminated; on the other hand, messages can be targeted for other road users and sent so that the message is transmitted directionally with the appropriate radar sensor 1 in the direction of the intended road user. When the controller 3 of a radar sensor 1 decides on its own to send a message to a detected object, this directed emission is ultimately inherent; however, other vehicle systems wishing to send messages via the car-to-car communication function of the radar sensors 1 may enlist at least one of the radar sensors 1 to directionally send these messages.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A radar sensor for a motor vehicle, comprising
   a single antenna arrangement comprising at least one transmit antenna and at least one receive antenna, wherein the at least one transmit antenna and the at least one receive antenna are configured to transmit and receive radar signals in a car-to-car communication, and
   a controller controlling operation of the antenna arrangement so as to transmit radar signals and messages in alternating cycles and to evaluate received radar signals,
   wherein the antenna arrangement is configured to at least one of transmit and receive in a frequency range that includes a radar frequency band and a communication frequency band partially overlapping with the radar frequency band,
   wherein an overlap between the radar frequency band and the communication frequency band is less than 20% of a width of the radar frequency band, or
   wherein an overlap between the radar frequency band and the communication frequency band is less than 40% of the width of the communication frequency band.

2. The radar sensor of claim 1, wherein the controller is configured to transmit evaluation data at least as part of a message.

3. The radar sensor of claim 2, wherein the controller is configured for targeted transmission of at least one of the evaluation data and additional data to an additional motor vehicle detected by the radar sensor and affected by the evaluation data.

4. The radar sensor of claim 3, wherein the additional data comprise data indicating at least a size of the motor vehicle.

5. The radar sensor of claim 3, wherein the controller is configured to consider, when evaluating the received radar signals, at least one of the evaluation data and the additional data received by the radar sensor or by an external communication device as part of a message.

6. The radar sensor of claim 1, wherein the frequency range is located between 5700 MHz and 6000 MHz.

7. The radar sensor of claim 1, wherein the antenna arrangement is constructed as a patch antenna array.

8. The radar sensor of claim 1, further comprising at least one filter unit connected downstream of the receive antenna for separating received radar signals and messages.

9. A motor vehicle, comprising at least one radar sensor having a single antenna arrangement with at least one transmit antenna and at least one receive antenna, wherein the at least one transmit antenna and the at least one receive antenna are configured to transmit and receive radar signals in a car-to-car communication, and a controller controlling operation of the antenna arrangement so as to transmit radar signals and messages in alternating cycles and to evaluate received radar signals,
   wherein the antenna arrangement is configured to at least one of transmit and receive in a frequency range that includes a radar frequency band and a communication frequency band partially overlapping with the radar frequency band, wherein an overlap between the radar frequency band and the communication frequency band is less than 20% of a width of the radar frequency band, or wherein an overlap between the radar frequency band and the communication frequency band is less than 40% of the width of the communication frequency band.

10. The motor vehicle of claim 9, wherein the motor vehicle comprises a plurality of radar sensors which cover surroundings of the motor vehicle.

11. A method for communicating between a motor vehicle and at least one other road user, comprising:

transmitting or receiving, or both, at least one message via a single, antenna arrangement of a radar sensor of the motor vehicle, the antenna arrangement comprising at least one transmit antenna and at least one receive antenna, wherein the antenna arrangement is configured to at least one of transmit and receive in a frequency range that includes a radar frequency band and a communication frequency band partially overlapping with the radar frequency band, wherein an overlap between the radar frequency band and the communication frequency band is less than 20% of a width of the radar frequency band, or wherein an overlap between the radar frequency band and the communication frequency band is less than 40% of the width of the communication frequency band, and cyclically controlling the transmit antenna to alternatingly transmit radar signals and to transmit messages.

\* \* \* \* \*